(12) United States Patent
Koo et al.

(10) Patent No.: US 12,301,279 B2
(45) Date of Patent: May 13, 2025

(54) METHOD AND APPARATUS FOR CONFIGURING MEDIUM ACCESS CONTROL (MAC) ADDRESS FOR ULTRA-WIDEBAND (UWB) COMMUNICATION

(71) Applicant: Samsung Electronics Co., Ltd., Gyeonggi-do (KR)

(72) Inventors: Jonghoe Koo, Gyeonggi-do (KR); Gyubong Oh, Gyeonggi-do (KR); Sehee Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 64 days.

(21) Appl. No.: 17/826,414

(22) Filed: May 27, 2022

(65) Prior Publication Data
US 2022/0385332 A1    Dec. 1, 2022

(30) Foreign Application Priority Data
May 28, 2021    (KR) .................. 10-2021-0069439

(51) Int. Cl.
*H04B 1/7163*    (2011.01)
*H04L 61/50*     (2022.01)
*H04L 101/622*   (2022.01)

(52) U.S. Cl.
CPC .......... *H04B 1/7163* (2013.01); *H04L 61/50* (2022.05); *H04L 2101/622* (2022.05)

(58) Field of Classification Search
CPC .............. H04B 1/7163; H04L 61/50; H04L 2101/622; H04L 61/5038; H04L 2101/672;
(Continued)

(56) References Cited

U.S. PATENT DOCUMENTS 8,098,662 B2    1/2012  Prakash et al.
10,355,921 B2   7/2019  Turvy, Jr. et al.
(Continued)

FOREIGN PATENT DOCUMENTS

CN    108632898       10/2018
KR    1020160111250    9/2016
(Continued)

OTHER PUBLICATIONS

WO 2003081460 A1 (Year: 2002).*
Dieter Coppens et al., "An Overview of UWB Standards and Organizations Interoperability Aspects and Future Research Directions", Jun. 30, 2022, 23 pages.
(Continued)

*Primary Examiner* — Sam K Ahn
*Assistant Examiner* — Amneet Singh
(74) *Attorney, Agent, or Firm* — The Farrell Law Firm, P.C.

(57) ABSTRACT

Disclosed is a method of a first ultra-wideband (UWB) device, including identifying an extended MAC address of the first UWB device, generating a short MAC address of the first UWB device based on the extended MAC address, selecting one of the short MAC address and the extended MAC address as a MAC address identifying the first UWB device, and performing UWB communication with a second UWB device, using the MAC address, wherein the second UWB device operates as a controller defining and controlling a control message for UWB ranging, and wherein the first UWB device operates as a controlee using information included in the control message.

18 Claims, 16 Drawing Sheets

(58) Field of Classification Search
CPC .............. H04L 61/5092; H04L 9/0631; H04L 9/0643; H04L 63/0876; H04L 2101/604; H04W 12/40; H04W 12/63
See application file for complete search history.

(56) References Cited

U.S. PATENT DOCUMENTS

| | | | |
|---|---|---|---|
| 2012/0099550 A1* | 4/2012 | Jia .......................... | H04W 76/11 |
| | | | 370/329 |
| 2016/0269930 A1* | 9/2016 | Huang .................. | H04W 8/005 |
| 2016/0277948 A1 | 9/2016 | Yeo et al. | |
| 2020/0225341 A1 | 7/2020 | Li et al. | |
| 2022/0066010 A1* | 3/2022 | Henry .................. | G01S 5/0236 |

FOREIGN PATENT DOCUMENTS

| | | | |
|---|---|---|---|
| KR | 10-2021-0007781 | 1/2021 | |
| WO | WO-2003081460 A1 * | 10/2003 | ......... H04L 12/2856 |
| WO | WO 2007/025869 | 3/2007 | |

OTHER PUBLICATIONS

International Search Report dated Aug. 24, 2022 issued in counterpart application No. PCT/KR2022/007587, 9 pages.
P802.15.4z/D01 Draft Standard for Low-Rate Wireless Networks, Amendment: Enhanced Ultra Wide-Band (UWB) Physical Layers (PHYs), and Associated Ranging Techniques, Apr. 2019, 143 pages.
European Search Report dated Oct. 8, 2024 issued in counterpart application No. 22811691.9-1203, 10 pages.

* cited by examiner

METHOD AND APPARATUS FOR CONFIGURING MEDIUM ACCESS CONTROL (MAC) ADDRESS FOR ULTRA-WIDEBAND (UWB) COMMUNICATION

CROSS-REFERENCE TO RELATED APPLICATION(S)

This application is based on and claims priority under 35 U.S.C. § 119 to Korean Patent Application No. 10-2021-0069439, filed on May 28, 2021, in the Korean Intellectual Property Office, the disclosure of which is incorporated herein by reference in its entirety.

BACKGROUND

1. Field

The disclosure relates to UWB communication, and more particularly, to a method and apparatus for configuring a MAC address for UWB communication.

2. Description of Related Art

The Internet is evolving from a human-centered connection network in which humans create and consume information to an Internet of things (IoT) in which information is exchanged and processed between distributed components such as objects. Internet of everything (IoE) technology is also emerging and is a combination of a big data processing technology based on a connection to a cloud server and the IoT technology. To implement the IoT, technology elements such as sensing technology, wired/wireless communication and network infrastructure, service interface technology, and security technology are required. Recently, technologies such as a sensor network, machine to machine (M2M), and machine type communication (MTC) have been studied for connection between objects.

In the IoT environment, an intelligent Internet technology (IT) service that collects and analyzes data generated from connected objects and thus creates new values in human life may be provided. The IoT may find its applications in the fields of smart home, smart building, smart city, smart car or connected car, smart grid, healthcare, smart home appliance, advanced medical service, and so on through convergence and merging between the existing information technology and various industries.

As various services may be provided along with the development of wireless communication systems, a method of effectively providing these services does not exist in the prior art and therefore is required. For example, a ranging technique for measuring a distance between electronic devices by using UWB may be used. The UWB is a wireless communication technology that uses a very wide frequency band of several gigahertz (GHz) or more in a baseband instead of a wireless carrier.

SUMMARY

Aspects of the disclosure are to address at least the above-mentioned problems and/or disadvantages and to provide at least the advantages described below. Accordingly, an aspect of the disclosure is to provide a method of generating an extended MAC address of a controlee.

Another aspect of the disclosure is to provide a method of generating a short MAC address of a controlee, using an extended MAC address of the controlee.

Another aspect of the disclosure is to provide a method of using an extended MAC address of a controlee as a MAC address for identifying the controlee.

Another aspect of the disclosure is to provide a method of transmitting an extended MAC address of a controlee and a short MAC address of the controlee to a controller.

In accordance with an aspect of the disclosure, a method of a first UWB device includes identifying an extended MAC address of the first UWB device, generating a short MAC address of the first UWB device based on the extended MAC address, selecting one of the short MAC address and the extended MAC address as a MAC address identifying the first UWB device, and performing UWB communication with a second UWB device, using the MAC address, wherein the second UWB device operates as a controller defining and controlling a control message for UWB ranging, and wherein the first UWB device operates as a controlee using information included in the control message.

In accordance with an aspect of the disclosure, a method of a second UWB device may include generating an extended MAC address of a first UWB device, transmitting the extended MAC address to the first UWB device through a first out-of-band (OOB) message, and performing UWB communication with the first UWB device, using one of the extended MAC address and a short MAC address of the first UWB device generated based on the extended MAC address as a MAC address for identifying the first UWB device, wherein the second UWB device operates as a controller defining and controlling a control message for UWB ranging, and wherein the first UWB device operates as a controlee using information included in the control message.

In accordance with an aspect of the disclosure, a first UWB device for performing secure ranging includes a transceiver, and a controller operationally connected with the transceiver, the controller being configured to identify an extended MAC address of the first UWB device, generate a short MAC address of the first UWB device based on the extended MAC address, select one of the short MAC address and the extended MAC address as a MAC address identifying the first UWB device, and perform UWB communication with a second UWB device, using the MAC address, wherein the second UWB device operates as a controller defining and controlling a control message for UWB ranging, and wherein the first UWB device operates as a controlee using information included in the control message.

In accordance with an aspect of the disclosure, a second UWB device for performing secure ranging includes a transceiver, and a controller operationally connected with the transceiver, the controller being configured to generate an extended medium access control (MAC) address of a first UWB device, transmit the extended MAC address to the first UWB device through a first out-of-band (OOB) message, and perform UWB communication with the first UWB device, using one of the extended MAC address and a short MAC address of the first UWB device generated based on the extended MAC address as a MAC address for identifying the first UWB device, wherein the second UWB device operates as a controller defining and controlling a control message for UWB ranging, and wherein the first UWB device operates as a controlee using information included in the control message.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
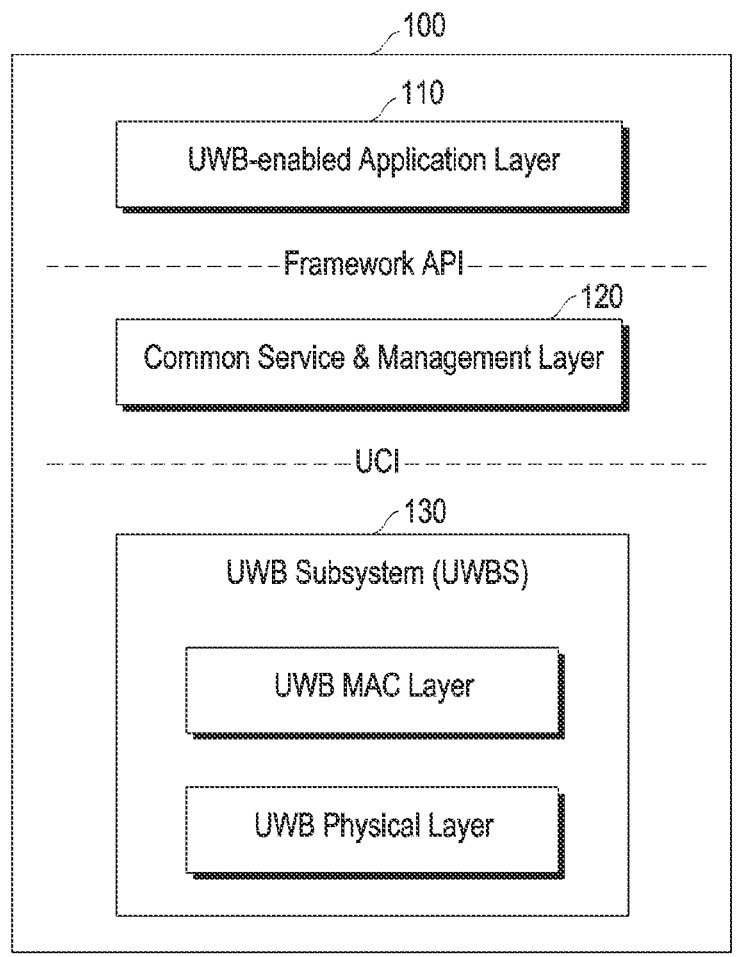
FIG. 1 illustrates a UWB device to which the disclosure is applied.

Embodiments of the disclosure will be described below in detail with reference to the attached drawings.

In the following description of the disclosure, a detailed description of a known function or structure will be omitted for the sake of clarity and conciseness.

For the same reason, some components may be exaggerated, omitted, or schematically illustrated in the drawings. The drawn size of each component does not exactly reflect its real size. In each drawing, the same reference numerals are assigned to the same or corresponding components.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art. Like reference numerals denote the same components throughout the specification.

The block diagrams herein may illustrate parts of modules, segments, or codes including one or more executable instructions for performing specific logic function(s). Moreover, it should be noted that the functions of the blocks may be performed in a different order in several alternative implementation examples. For example, two successive blocks may be performed substantially at the same time, or may be performed in reverse order according to their functions.

The term unit as used herein indicates, but is not limited to, a software or hardware component, such as a field programmable gate array (FPGA) or application specific integrated circuit (ASIC), which performs certain tasks. A unit may advantageously be configured to reside on an addressable storage medium and configured to be executed on one or more processors. Thus, a unit may include components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and units may be combined into fewer components and units or further separated into additional components and units. In addition, the components and units may be implemented such that they are executed on one or more central processing units (CPUs) in a device or a secure multimedia card. A unit may also include one or more processors.

The term as used herein, terminal or device may be replaced with mobile station (MS), user equipment (UE), user terminal (UT), wireless terminal, access terminal (AT), subscriber unit, subscriber station (SS), wireless device, wireless communication device, wireless transmit/receive unit (WTRU), mobile node, mobile, or other terms. Various embodiments of a terminal may include a cellular phone, a smart phone equipped with a wireless communication function, a personal digital assistant (PDA) equipped with a wireless communication function, a wireless modem, a portable computer equipped with a wireless communication function, a capturing device such as a digital camera equipped with a wireless communication function, a gaming device equipped with a wireless communication function, a home appliance equipped with a wireless communication function, for storing and playing music, an Internet appliance capable of connecting to and browsing a wireless Internet, and a portable unit or terminal that integrates these functions. Further, the terminal may include, but not limited to, a machine to machine (M2M) terminal and a machine type communication (MTC) terminal/device. In the disclosure, a terminal may also be referred to as an electronic device.

Although the terms used in the disclosure are defined in consideration of functions in the disclosure, the terms may be changed according to the intention of a user or an operator, or customs. Therefore, the definitions should be made, not simply by the actual terms used but by the meanings of each term lying within.

While the embodiments of the disclosure are described in the context of a UWB communication system as an example, the embodiments of the disclosure are also applicable to other communication systems having a similar technical background or similar characteristics, such as Bluetooth™ or Zigbee™. Accordingly, the embodiments of the disclosure may be applied to other communication systems with some modifications made without departing from the scope of the disclosure.

In general, wireless sensor network technologies are largely divided into a wireless local area network (WLAN) technology and a wireless personal area network (WPAN) technology according to recognition distances. WLAN is based on Institute of Electrical and Electronics Engineers 802.11 (IEEE 802.11), which provides connectivity to a backbone network within a radius of about 100 m. WPAN is based on IEEE 802.15 and includes Bluetooth™, Zigbee™, and UWB. A wireless network in which these wireless network technologies are implemented may include a plurality of electronic devices.

UWB may refer to a short-range high-speed wireless communication technology using a wide frequency band of several GHz or more, a low spectral density, and a short pulse width (1 to 4 nsec) in a baseband state. UWB may also refer to a band to which UWB communication is applied. UWB enables secure and accurate ranging between devices.

Specific terms used in the following description are provided to assist in the understanding of the disclosure, and may be changed to other forms without departing from the technical spirit of the disclosure.

An application dedicated file (ADF) may be a data structure that may host an application or application specific data.

An application protocol data unit (APDU) may be a command and a response used when communication is performed with an application data structure in a UWB device.

Application specific data may be a file structure having a root level and an application level which include UWB controlee information and UWB session data required for a UWB session.

A controller may be a ranging device that defines and controls a ranging control message (RCM) (or a control message). The controller may define and control ranging features by sending the control message.

A controlee may be a ranging device using a ranging parameter included in an RCM (or control message) received from the controller. The controlee may utilize the ranging features as configured via the control message from the controller.

A dynamic scrambled timestamp sequence (STS) mode may be an operation mode in which an STS is not repeated during a ranging session, unlike a static STS". In an embodiment, in this mode, the STS may be managed by a ranging device, and a ranging session key used in generating the STS may be managed by a secure component.

An applet may be executed on a secure component including UWB parameters and service data. In the disclosure, the applet may be an FiRa applet.

A ranging device (RDEV) or an enhanced ranging device (ERDEV) is defined in IEEE Std 802.15.4/4z. In the disclosure, the RDEV may be an FiRa device. The RDEV may be referred to as a UWB device.

A UWB-enabled application uses a framework application programming interface (APT) for configuring an out-of-band (OOB) connector, a secure service, and/or a UWB service, for a UWB session. In the disclosure, UWB-enabled application may be abbreviated as application or UWB application. The UWB-enabled application may be an FiRa-enabled application.

A framework may be a collection of logical software components including an OOB connector, a secure service, and/or a UWB service. In the disclosure, the framework may be an FiRa framework.

An OOB connector may be a software component for establishing an OOB connection (e.g., Bluetooth low energy (BLE) connection) between RDEVs. In the disclosure, the OOB connector may be an FiRa OOB connector.

A profile may be a predefined set of UWB and OOB configuration parameters. In the disclosure, the profile may be an FiRa profile.

A profile manager may be a software component that implements a profile available for a RDEV. In the disclosure, the profile manager may be an FiRa profile manager.

A service may be an implementation of a use case that provides a service to an end-user.

A smart RDEV may implement an optional framework API. In the disclosure, the smart RDEV may be an FiRa smart device.

A global dedicated file (GDF) may be a root level of application specific data including data required to establish a UWB session.

A framework API may be used by a UWB-enabled application to communicate with a framework.

An initiator may be an RDEV that initiates a ranging exchange by sending the first RFRAME (ranging initiation message).

An object identifier (OID) may be an identifier (ID) of an ADF in an application data structure.

Out-of-band (OOB) may be data communication that does not use UWB as an underlying wireless technology.

A ranging data set (RDS) may be data (e.g., a UWB session key or a session ID) required to establish a UWB session requiring protection of confidentiality, authenticity, and integrity.

A responder may be an RDEV that responds to an initiator in a ranging exchange. The responder may respond to the ranging initiation message received from the initiator.

An STS may be a ciphered sequence for increasing the integrity and accuracy of ranging measurement timestamps. The STS may be generated from a ranging session key.

A secure channel may be a data channel that prevents overhearing and tampering.

A secure component may be an entity with a defined security level, which interfaces with an ultra-wideband subsystem (UWBS) for the purpose of providing an RDS to the UWBS when a dynamic STS is used.

A secure element (SE) may be a tamper-resistant secure hardware component that may be used as a secure component in a RDEV.

Secure ranging may be based on an STS generated through a strong encryption operation.

A secure service may be a software component for interfacing with a secure component, such as an SE or a trusted execution environment (TEE).

A service applet may be on a secure component that handles a service specific transaction.

Service data may be defined by a service provider, which needs to be transmitted between two RDEVs to implement a service.

A service provider may define and provide hardware and software required to provide a specific service to an end-user.

A static STS mode is an operation mode in which an STS is repeated during a session and does not need to be managed by a secure component.

A SUS applet may be on an SE that communicates with an applet to search for data needed to enable a secure UWB session with other RDEVs. In addition, the SUS applet may transmit corresponding data (information) to a UWBS.

A UWB service may be a software component that provides access to a UWBS.

A UWB session may be a period from a time when a controller and a controlee start communication through UWB until the communication stops. The UWB session may include ranging, data transmission, or both ranging and data transmission.

A UWB session ID may be an ID (e.g., a 32-bit integer) that identifies a UWB Session, shared between a controller and a controlee.

A UWB session key may be used to protect a UWB session. The UWB session key may be used to generate an STS. In the disclosure, the UWB session key is a UWB ranging session key (URSK) and may be referred to shortly as a session key.

A UWB subsystem (UWBS) may be a hardware component implementing UWB physical (PHY) and medium access control (MAC) specifications. The UWBS may have an interface with a framework and an interface with a secure component to search for an RDS.

A MAC address may identify a UWB terminal or a UWBS. For example, either a short MAC address with a length of 2 bytes or an extended MAC address with a length of 8 bytes may be used as the MAC address. A MAC address mode may be a parameter that determines whether to use a short MAC address or an extended MAC address as the MAC address. The MAC address and the MAC address mode to be used for ranging may be delivered from a UWB framework including a UWB service to a UWBS.

A scheduling mode may refer to a method in which a UWB device (terminal) accesses a radio channel for ranging and transmits and receives UWB messages. In the scheduling mode, a controller may determine scheduling information including information about time slots in which controlee(s) controlled by the controller may transmit UWB messages and transmit the scheduling information to the controlee(s). The scheduling information transmitted from the controller to the controlee(s) may be referred to as a RDEV management list. The RDEV management list may include a plurality of RDEV management list elements, and a single RDEV management list may include the device role of a controlee, an assigned time slot index, the address of the controlee, the ID of a UWB message to be transmitted by the controlee, whether ranging is stopped, and so on.

A contention mode may refer to another method in which a UWB terminal accesses a radio channel for ranging and transmits and receives UWB messages. In the contention mode, a controlee may transmit a UWB message without receiving a controller's scheduling information. In the contention mode, the controller may set a contention window size representing a time period in which UWB terminals may freely transmit. The set contention window size may be included in a control message transmitted by the controller and transmitted to neighboring UWB terminals. A neighboring UWB terminal may determine a time period in which it may freely transmit a message, based on the contention window size included in the control message received from the controller, and transmit a message for ranging within this time period.

FIG. 1 illustrates a UWB device to which the disclosure is applied.

In FIG. 1, a UWB device (electronic device) 100 may be an RDEV supporting UWB secure ranging, such as a smart RDEV.

In FIG. 1, a UWB device may interact with another UWB device via a UWB session, using information/parameters previously exchanged with the other UWB device. The UWB device may also implement a framework API, which enables a UWB-enabled application on the UWB device to use the UWB capabilities of the UWB device in a predetermined manner.

Referring to FIG. 1, the UWB device 100 may include a UWB-enabled application layer 110, a common service & management layer 120, and/or a UWBS 130 including a UWB MAC layer and a UWB physical layer. The UWB device 100 may not include some layers or may further include an additional layer (e.g., a security layer).

The UWB-enabled application layer 110 may be a layer of an FiRa-enabled application using a framework API to configure an OOB connector, a secure service, and a UWB service, for a UWB session.

The common service & management layer 120 may define a common component and procedure needed to implement UWB secure ranging.

The UWBS 130 may include a UWB MAC layer and a UWB physical layer. The UWBS may perform UWB-based communication for secure ranging with a UWBS of another UWB device. The UWBS may be based on FiRa PHY and MAC specifications referencing IEEE 802.15.4/4z specifications.

Figure 2:
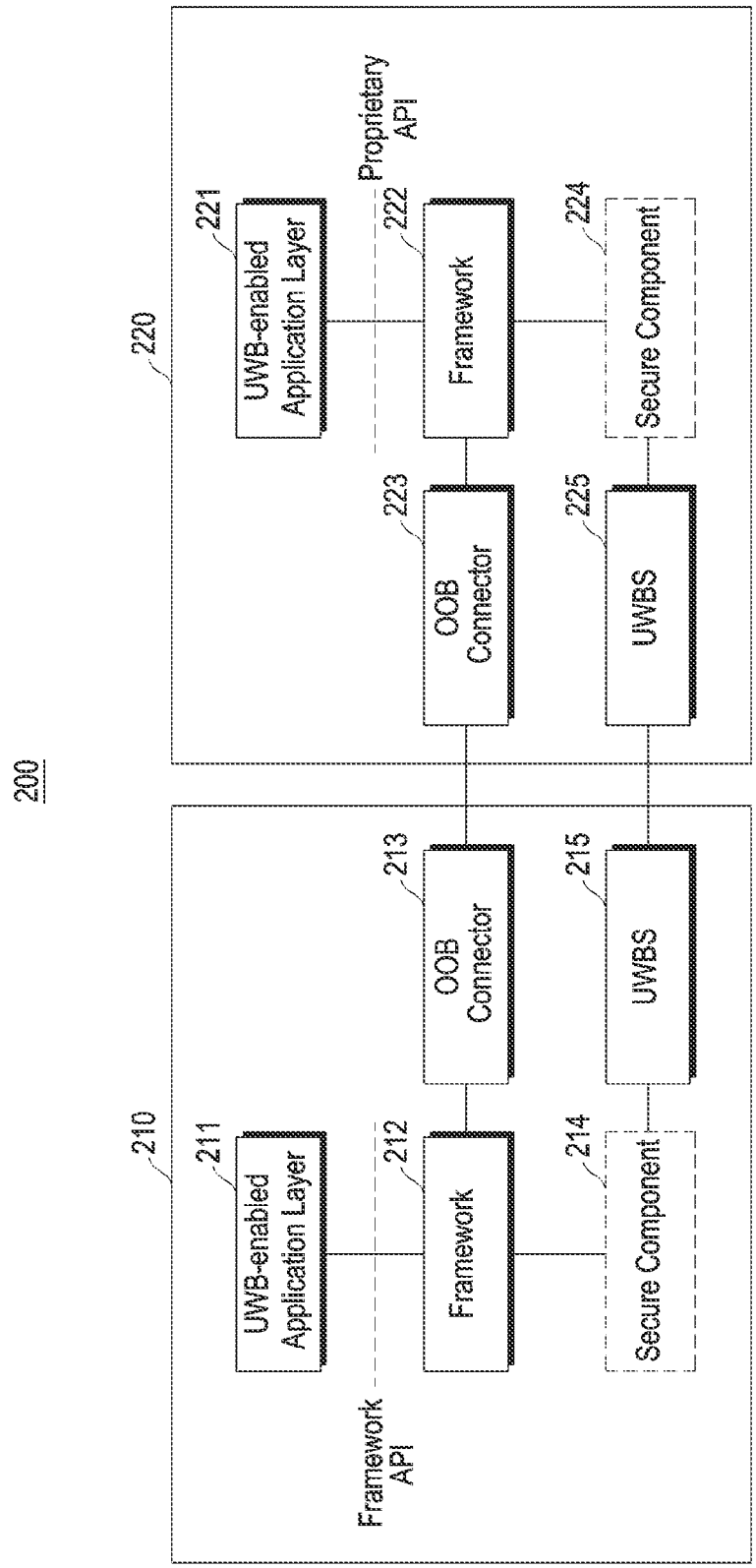
FIG. 2 illustrates a communication system including UWB devices to which the disclosure is applied.

FIG. 2 illustrates a configuration of a communication system including UWB devices to which the disclosure is applied.

Referring to FIG. 2, a communication system 200 includes a first UWB device 210 and a second UWB device 220. The first UWB device 210 may be a smart RDEV, and the second UWB device 220 may be an RDEV. Both the first UWB device 210 and the second UWB device 220 may support UWB secure ranging.

The first UWB device 210 may host one or more UWB-enabled applications 211 which may be installed by a user (e.g., a mobile phone) based on a framework API. The second UWB device 220 may use a proprietary interface to implement a specific UWB-enabled application 221 provided only by a manufacturer, without providing a framework API.

Both the first UWB device 210 and the second UWB device 220 may be smart RDEVs or RDEVs.

Each of the first UWB device 210 and the second UWB device 220 may include a UWB-enabled application layer 211, 221, a framework 212, 222, an OOB component/connector 213, 223, a secure component 214, 224, and/or a UWBS 215, 225, and some components may be omitted. The foregoing description may be referred to for a description of each component.

The first UWB device 210 and the second UWB device 220 may generate an OOB connection (channel), using the OOB components 213, 223 (e.g., Bluetooth™ low energy (BLE) components), and exchange parameters for establishing a UWB session through the OOB channel.

The first UWB device 210 and the second UWB device 220 may perform UWB ranging and service data transaction via the UWB session which has been established through the UWBSs 215, 225, using the parameters exchanged with each other.

In the disclosure, an OOB component may be referred to as an OOB subsystem and the UWB-enabled application layer and/or the framework may be implemented by an application processor (AP). Therefore, an operation of the UWB-enabled application layer and/or the framework may be understood as performed by the AP.

Figure 3:
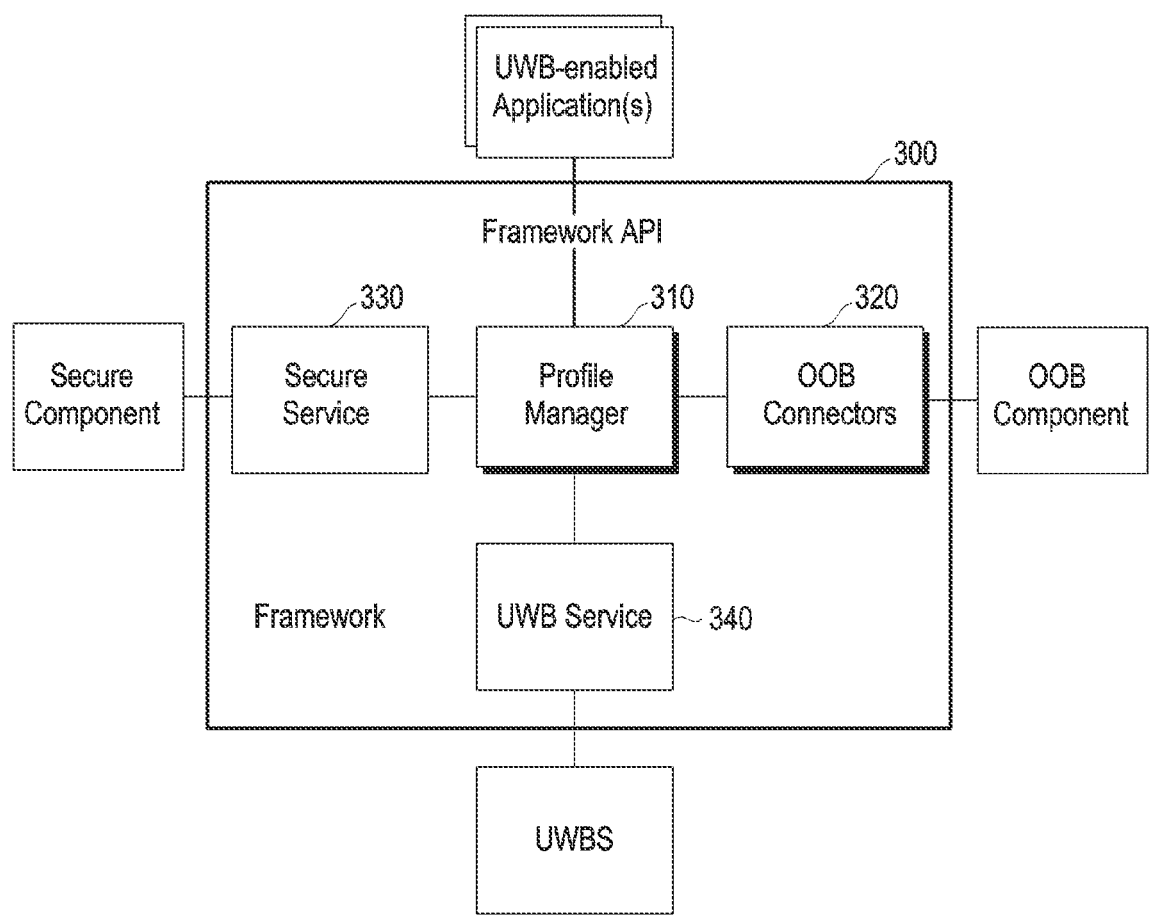
FIG. 3 illustrates a framework included in a UWB device according to an embodiment.

FIG. 3 illustrates a configuration of a framework included in a UWB device according to an embodiment.

A framework 300 of FIG. 3 may be an FiRa framework defined by FiRa.

As described above, the framework 300 may be a set of logical software components. A UWB-enabled application may interface with the framework 300 through a framework API provided by the framework 300.

Referring to FIG. 3, the framework 300 may include a profile manager 310, an OOB connector 320, a secure service 330, and/or a UWB service 340. However, some entities may be omitted or additional entities may further be included.

The profile manager 310 may manage profile(s) available in a UWB device (RDEV). A profile may be a set of UWB and OOB configuration (setup) parameters required to establish a successful UWB session between RDEVs. In addition, the profile manager may abstract or obtain UWB and OOB configuration parameters from a UWB-enabled application.

The OOB connector 320 may establish an OOB connection between UWB devices (RDEVs), may serve to interface with an OOB component, and may handle a discovery phase and a connection phase to provide a UWB-based service.

The secure service 330 may interface with a secure component such as an SE or a TEE.

The UWB service 340 may provide access to a UWBS. An interface between the UWB service 340 and the UWBS may be referred to as a UWB command interface (UCI). A UWB UCI layer may exist between the UWB service 340 and the UWBS, and in this case, the UCI may be an interface between the UWB UCI layer and the UWBS. A UWB framework including the UWB service 340 and the UWB UCI layer may be collectively referred to as a host. The host may transmit a command to the UWBS via the UCI, and the UWBS may transmit a response to the command to the host. The UWBS may transmit a notification to the host via the UCI.

The host may transmit application configuration parameters to the UWBS via the UCI. The application configuration parameters are required for the UWBS to perform ranging. The application configuration parameters may include a device role DEVICE_ROLE, a multi-node mode MULTI_NODE_MODE, the number of controlees NUMBER_OF_CONTROLEES, the MAC address of the device DEVICE_MAC_ADDRESS, the MAC address of the other party DST_MAC_ADDRESS, and/or a device type DEVICE_TYPE. The application configuration parameters may be a part of a parameter RANGING_ROUND_USAGE APP Configuration.

Figure 4:
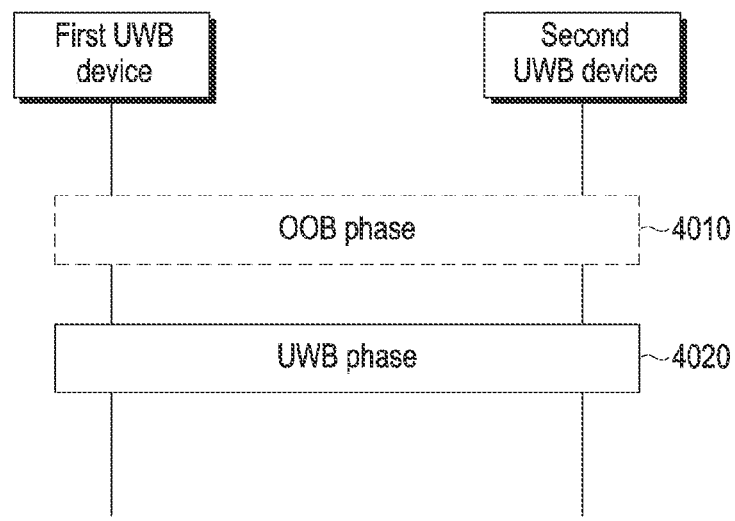
FIG. 4 illustrates a method of performing UWB communication between two UWB devices according to an embodiment.

FIG. 4 illustrates a method of performing UWB communication between two UWB devices according to an embodiment.

In FIG. 4, a first UWB device may serve as a controller (or controlee), and the second UWB device may serve as a controlee (or controller) being the counterpart of the role of the first UWB device. The first UWB device may serve as an initiator (or responder), and the second UWB device may serve as a responder (or initiator) being the counterpart of the role of the first UWB device.

Referring to FIG. 4, in step 4010, the first UWB device and the second UWB device may perform an OOB phase prior to performing a UWB phase.

The OOB phase may be performed to discover a UWB device through an OOB channel (e.g., BLE channel) and establish and control a UWB session. The OOB phase may include discovering a UWB device (OOB discovery), establishing an OOB connection (channel), establishing a secure channel to protect messages and data, and/or exchanging parameters (e.g., a UWB capability parameter (controlee capability parameter), a UWB configuration parameter, and a session key-related parameter) for configuring a UWB session through the secure channel (parameter exchange). In the disclosure, the OOB phase may be referred to as an OOB connection phase.

The parameter exchange may include transmitting a controlee capability parameter/message UWB_CAPABILITY from the controlee to the controller (UWB capability parameter exchange), transmitting a UWB configuration parameter/message UWB_CONFIGURATION from the controller to the controlee (UWB configuration parameter exchange), and/or transmitting a session key-related parameter/message SESSION_KEY_INFO for protecting the UWB session from one UWB device to the other UWB device (session key parameter exchange). The UWB capability parameter and/or the session key parameter may be transmitted in a controlee information message CONTROLEE_INFO, which is an OOB message transmitted from the controlee to the controller. The UWB configuration parameter and/or the session key parameter may be transmitted in a session data message SESSION_DATA which is an OOB message transmitted from the controller to the controlee.

The controlee capability parameter UWB_CAPABILITY may include at least one parameter that provides information about the device capability of the controlee. For example, the controlee capability parameter UWB_CAPABILITY may include some or all of the parameters illustrated in Table 1 below.

TABLE 1

| Parameter | Notes |
| --- | --- |
| Device Roles | Initiator<br>0: Controlee(s) does not support Initiator feature.<br>1: Controlee(s) support Initiator feature.<br>Responder<br>0: Controlee(s) does not support Responder feature.<br>1: Controlee(s) support Responder feature. |
| Multi-node mode support | Support for unicast ranging<br>0: Controlee(s) does not support unicast ranging.<br>1: Controlee(s) support unicast ranging.<br>Support for one-to-many feature<br>0: Controlee(s) does not support one-to-many feature.<br>1: Controlee(s) support one-to-many feature.<br>Support for many-to-many feature<br>0: Controlee(s) does not support many-to-many feature.<br>1: Controlee(s) support many-to-many feature. |
| STS Configuration Support | Support for Static STS<br>0: Controlee(s) does not support Static STS<br>1: Controlee(s) supports Static STS<br>Support for Dynamic STS<br>0: Controlee(s) does not support Dynamic STS<br>1: Controlee(s) supports Dynamic STS<br>Support for Dynamic STS for Controlee Individual Key<br>0: Controlee(s) does not support Dynamic STS for Controlee Individual Key<br>1: Controlee(s) supports Dynamic STS for Controlee Individual Key |
| Ranging Methods Support | Support for One Way Ranging aka TDoA<br>0: Controlee(s) does not support TDoA<br>1: Controlee(s) supports TDoA |

TABLE 1-continued

| Parameter | Notes |
|---|---|
| | Support for single-sided two-way ranging (SS-TWR)<br>0: Controlee(s) does not support SS-TWR<br>1: Controlee(s) supports SS-TWR<br>Support for DS-TWR<br>0: Controlee(s) does not support DS-TWR<br>1: Controlee(s) supports DS-TWR |
| RFRAME Feature Capability | SP0 RFRAME Feature Capability<br>0: Controlee(s) does not support SP0 RFRAME.<br>1: Controlee(s) support SP0 RFRAME.<br>SP1 RFRAME Feature Capability<br>0: Controlee(s) does not support SP1 RFRAME.<br>1: Controlee(s) support SP1 RFRAME.<br>SP2 RFRAME Feature Capability<br>0: Controlee(s) does not support SP2 RFRAME.<br>1: Controlee(s) support SP2 RFRAME.<br>SP3 RFRAME Feature Capability<br>0: Controlee(s) does not support SP3 RFRAME.<br>1: Controlee(s) support SP3 RFRAME. |
| Angle of Arrival (AoA) Support | Support for AoA Azimuth measurement<br>0: Controlee does not support AoA Azimuth measurement<br>1: Controlee supports AoA Azimuth measurement<br>Support for AoA Elevation measurement<br>0: Controlee does not support AoA Elevation measurement<br>1: Controlee supports AoA Elevation measurement<br>Support for AoA FoM<br>0: Controlee does not support AoA FoM<br>1: Controlee supports AoA FoM |
| Scheduled Mode support | Support for contention-based ranging as defined in IEEE 802.15.4z.<br>0: Controlee does not support contention-based Ranging<br>1: Controlee supports contention-based Ranging<br>Support for time-scheduled ranging<br>0: Controlee does not support Time Scheduled Ranging<br>1: Controlee supports Time Scheduled Ranging |
| Device Class | Device Class<br>0: Device Class 1 (Both Controller & Controlee)<br>1: Device Class 2 (Controller)<br>2: Device Class 3 (Controlee) |

The controller may transmit the controlee capability parameter to the controller according to a request of the controller. For example, the controller may transmit a GET request to the controlee to obtain the controlee capability parameter, and the controlee may transmit the controlee capability parameter to the controller in response to the GET request.

In another embodiment, the controlee may transmit the controlee capability parameter to the controller regardless of the controller's request. For example, the controlee may transmit a PUT request to the controller to push the controlee capability parameter to the controlee, and the controller may respond to the PUT request. In this case, the controlee capability parameter may be included in the PUT request.

The UWB configuration parameter UWB_CONFIGURATION may include at least one parameter used to configure a UWB session. For example, the UWB configuration parameter may include some or all of the parameters illustrated in Table 2 below.

TABLE 2

| Parameter | Notes |
|---|---|
| UWB Session ID | Identifier for UWB session. 32 bit unsigned integer |
| Ranging Method | 0: One Way Ranging (OWR).<br>1: SS-TWR.<br>2: Double-Sided Two-Way Ranging (DS-TWR).<br>3: RFU. |
| Multi-node Mode | 0: Unicast Ranging.<br>1: One-to-Many Ranging.<br>2: Many-to-Many Ranging.<br>3: RFU. |
| RFRAME Configuration | 0: SP0.<br>1: SP1.<br>2: RFU.<br>3: SP3. |
| STS Config | 0: Static STS<br>1: Dynamic STS using a single UWB Session Key for all Responders<br>2: Dynamic STS using Responder Specific Sub-session Key |
| Scheduled Mode | 0: Contention Based Ranging<br>1: Time Scheduled Ranging |
| Maximum Contention Phase Length | Maximum number of slots for Contention-Based ranging |
| Time of Flight (ToF) Report | 0: No ToF Report.<br>1: ToF Report. |
| AoA Azimuth Report | 0: No AoA Azimuth Report.<br>1: AoA Azimuth Report. |
| AoA Elevation Report | 0: No AoA Elevation Report<br>1: AoA Elevation Report. |
| AoA FOM Report | 0: No AoA FoM Report<br>1: AoA FoM Report. |
| Slots per Ranging Round | Number of slots per ranging round. This parameter is not applicable for contention based ranging. This parameter is used to specify the ranging Round Duration in multiples of Slot Duration |
| Slot Duration | Unsigned integer that specifies the duration of a ranging slot in the unit of ranging scheduling time unit (RSTU). |
| Ranging Interval | Expressed in the unit of 1200 RSTU which is 1 millisecond (ms) between beginning of one ranging round to the beginning of the next. Minimum Ranging Interval should be at least the duration of one ranging round length. |
| Responder Slot Index | This parameter is used to select a Responder index in Two Way Ranging. It is not applicable to the Initiator.<br>Note: the in-band Control Message takes priority and may override this setting |
| STS Index | STS index initialization value<br>This can be overridden by UWBS<br>Used only if STS Config is not zero |
| Ranging Round Control | This parameter is used to enable/disable the data exchange packets in Ranging Round<br>1 - Enable, 0 - Disable<br>b0 - Result Report Phase<br>b1 - Control Phase<br>b2: b6 - RFU<br>b7 - Measurement Report (MR) data availability<br>[0]: At Responder (Direction of MR message is from Initiator to Responder)<br>[1]: At Initiator (Direction of MR message is from Responder to Initiator)<br>Note: the in-band Control Message takes priority and may override this setting. |
| MAC Address Mode | The application can configure MAC Addressing mode to be used in UWBS, possible configurations are<br>Short MAC address (2 octets) will be used in MAC header<br>Extended MAC address (8 octets) will be used in MAC header<br>0x00 - MAC address is 2 bytes and 2 bytes to be used in MAC header<br>0x01 - MAC address is 8 bytes and 2 bytes to be used in MAC header (Not supported)<br>0x02 - MAC address is 8 bytes and 8 bytes to be used in MAC header<br>Note: Both Device MAC Address and DST MAC Address to be sent with above addressing mode. |
| Device MAC Address | MAC address of the device configured via UCI interface |
| Number of Controlees | The number of Controlees (N). The number of Controlees for one-to-many ranging the number Controlee can be |

TABLE 2-continued

| Parameter | Notes |
| --- | --- |
|  | between 1 to 8 as mandatory but implementation can support more than 8 anchors |
| DST MAC Address | MAC Address list (N) for Number of Controlees devices participating in UWB Session. The Short Address (2 bytes) or extended MAC address (8 bytes) is indicated via MAC Address Mode |

The controller may transmit the UWB configuration parameter to the controlee according to a request of the controlee. For example, the controlee may transmit a GET request to the controller to obtain the UWB configuration parameter, and the controller may transmit the UWB configuration parameter to the controlee in response to the GET request.

In another embodiment, the controller may transmit the UWB configuration parameter to the controlee irrespective of the controlee's request. For example, the controller may transmit a PUT request to the controlee to configure the UWB configuration parameter for the controlee, and the contolee may respond to the PUT request. In this case, the UWB configuration parameter may be included in the PUT request.

The session key-related parameter SESSION_KEY_INFO may include some or all of the parameters illustrated in Table 3 or Table 4 below. Table 3 illustrates an example of a session key-related parameter for a dynamic STS, and Table 4 illustrates an example of a session key-related parameter for a static STS.

TABLE 3

| Parameter | Notes |
| --- | --- |
| UWB Session Key info length | Length of UWB Session Key info parameter |
| UWB Session Key info | Data exchanged to generate the UWB Session Key or directly used as UWB Session Key. |
| UWB sub session key info length | Length of UWB Sub Session key info parameter |
| UWB sub session key info | Data exchanged to generate the Sub Session Key. |

TABLE 4

| Parameter | Notes |
| --- | --- |
| Vendor ID | 16 bits unsigned integer, Unique ID of vendor. Vendor in this context is the FiRa enabled application provider. This is used to set phyVupper64[15:0] as defined in FiRa MAC technical requirements |
| Static STS IV | Array of 6 bytes. Pre-defined arbitrary value chosen by the vendor for FiRa enabled application on FiRa Smart Device and FiRa device. This is used to set vUpper64[63:16] as defined in FiRa MAC technical requirements. |

The session key-related parameter SESSION_KEY_INFO may also be transmitted from one UWB device to the other UWB device according to or regardless of a request from the other UWB device. For example, the session key-related parameter SESSION_KEY_INFO may be transmitted in a GET request or a PUT request from the one UWB device to the other UWB device.

In step 4020, the first UWB device and the second UWB device may perform a UWB phase.

In the UWB phase, UWB ranging is performed through a UWB session and service data is transmitted. The UWB phase may include initiating a UWB session, performing UWB ranging, and/or exchanging service data (transaction). In the disclosure, the UWB phase may be referred to as a UWB connection phase.

The above-described OOB phase may be skipped, such as when UWB device discovery and/or UWB session establishment and control is performed through a UWB channel (in-band). For example, when in-band discovery is performed, the OOB phase in which OOB discovery is performed may be skipped. In this case, the UWB phase may further include discovering a UWB device through a UWB channel and exchanging parameters for UWB session establishment.

For UWB communication (e.g., UWB ranging) between two UWB devices, MAC address-related information/parameters need to be configured for each of the two UWB devices.

The MAC address-related information may include first information indicating a MAC address of the controller, second information indicating MAC address(es) of at least one controlee controlled by the controller, and/or third information indicating a MAC address mode. Herein, the first information may be referred to as device MAC address information, the second information may be referred to as destination (DST) MAC address information, and the third information may be referred to as MAC address mode information.

The third information may be used to indicate whether a MAC address to be used in a UWBS is a short MAC address (2 bytes) or an extended MAC address (8 bytes), and may be determined based on the third information whether to use a short MAC address or an extended MAC address as the MAC addresses of the first information and the second information.

The framework and/or application (or AP) of the UWB device may configure its MAC address to be used in the UWBS via the UCI. For example, the AP of the UWB device may configure its MAC address to be used in the UWBS through an application configuration parameter. Table 5 below illustrates an example of the application configuration parameter.

TABLE 5

| Parameter Name | Description |
| --- | --- |
| DEVICE_TYPE | 0x00 = Controlee<br>0x01 = Controller<br>Values 0x02 to 0xFF = RFU |
| ... | ... |
| NUMBER_OF_CONTROLEES | Number of controlees(N)<br>1 <= N <= 8 |
| DEVICE_MAC_ADDRESS | Mac address of the UWBS itself participating in UWB session. UWBS can override the Device MAC Address. The short address (2 bytes) or extended MAC address (8 bytes) shall be indicated via MAC_ADDRESS_MODE config |
| DST_MAC_ADDRESS | MAC Address list(N) for NUMBER_OF_CONTROLEES devices participating in UWB Session. The short address (2 bytes) or extended MAC address (8 bytes) shall be indicated via MAC_ADDRESS_MODE config |

The UWB device may exchange the MAC address of the controlee and/or the MAC address of the controller with the other UWB device through an QOB channel or a UWB channel, such as through a controlee capability parameter and/or a UWB configuration parameter. Table 1 above and Table 6 below illustrate a controlee capability parameter, and Table 2 above illustrates a UWB configuration parameter.

The UWB device may determine one of the configured short MAC address and extended MAC address as a MAC address, and includes all or part of the MAC address in a MAC header of a MAC frame, to perform UWB communication with the other UWB device. The MAC address may be used to indicate (or identify) a source device and/or a destination device of a UWB message. That is, the MAC address may be an address identifying the UWB device or the UWBS.

The MAC address may be included in a source address field or a destination address field of the MAC header. The MAC address of the source address field may specify the address of an originator (source device) of the MAC frame, and the MAC address of the destination address field may specify the address of an intended recipient (destination device) of the MAC frame.

Configuration methods may be classified according to channel access modes (schedule modes) for the MAC address of the controlee, as follows:

(1) When the Channel Access Mode is a Scheduling Mode (e.g. Time Scheduled Ranging Mode)

In this mode, the controller should have prior knowledge of the MAC address of the controlee to schedule the controlee. In this case, the controller may obtain the MAC address of the controlee in the following two methods.

Method 1-1: The controller generates a MAC address of the controlee and transmits the MAC address to the controlee (e.g., the controller generates the MAC address of the controlee and transmits the generated MAC address in the above-described OOB phase).

Method 1-2: The controlee generates its MAC address and transmits the MAC address to the controller (e.g., the controlee generates the MAC address of the controlee and transmits the generated MAC address in the above-described OOB phase or through in-band communication).

(2) When the Channel Access Mode is a Contention Mode (e.g., Contention Based Ranging Mode)

Unlike the scheduling mode, the controller may not have prior knowledge of the MAC address of the controlee in this mode. However, to perform in-band discovery and UWB ranging according to this mode, the controlee should have its MAC address in advance. In this case, the controlee may obtain its MAC address in the following two methods.

Method 2-1 (applied when the above-described OOB phase is performed before a contention mode operation): The controller generates a MAC address of the controlee and transmits the MAC address to the controlee in the OOB phase, or the controlee generates a MAC address and transmits the MAC address to the controller in the OOB phase.

Method 2-2 (applied when the above-described OOB phase is not performed before a contention mode operation): The controlee autonomously generates its MAC address.

As described above, the MAC address of the controlee may be generated and transmitted to the controlee by the controller. However, the MAC address of the controlee may need to be generated by the controlee. In addition, the MAC address of the controlee generated by the controlee in this manner needs to be transmitted to the controller, when needed.

Figure 5:
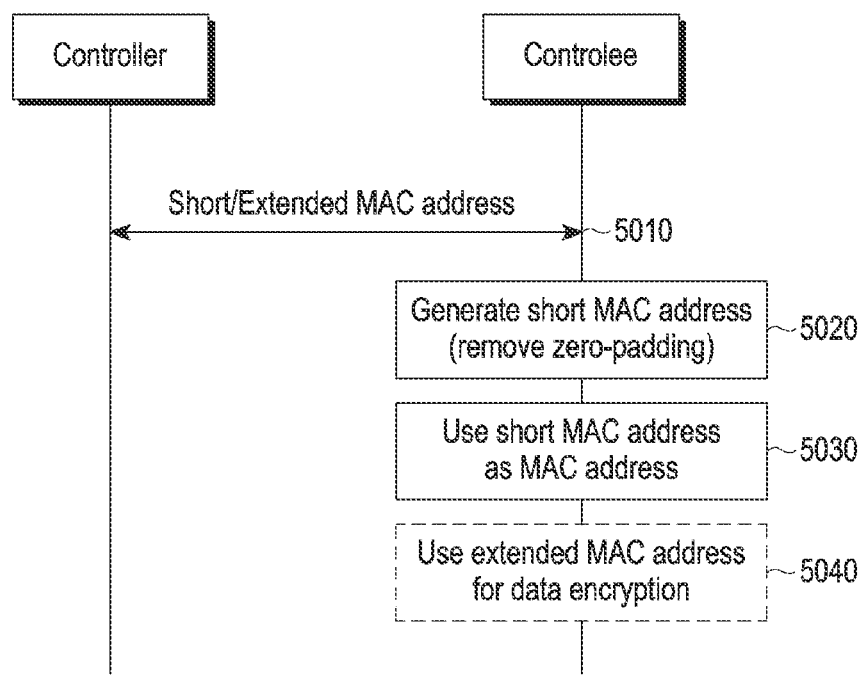
FIG. 5 illustrates a method of configuring a MAC address according to an embodiment.

FIG. 5 illustrates a method of configuring a MAC address according to an embodiment.

In FIG. 5, a short MAC address corresponds to a 2-byte address, and an extended MAC address corresponds to an 8-byte address formed by adding 6 bytes of zero padding to the short MAC address.

Referring to FIG. 5, in step S010, the controller and the controlee may exchange a short MAC address and/or an extended MAC address of each UWB device with each other.

The controller may generate a short MAC address and/or an extended MAC address of the controlee, and transmit the short MAC address and/or the extended MAC address to the controlee. Alternatively, the controlee may generate its short MAC address and/or extended MAC address and transmit the short MAC address and/or the extended MAC address to the controller. The short MAC addresses and/or the extended MAC addresses of the controlee may be exchanged through this operation.

In step S020, when identifying (or obtaining) the extended MAC address of the controlee (or the controller), the controlee may generate a short MAC address based on the extended MAC address. Upon receipt of the extended MAC address of the controlee (or the controller) from the controller (or when the extended MAC address of the controlee is generated by the controller), the controlee may generate a 2-byte short MAC address by removing 6 bytes of zero padding in the extended MAC address.

In step S030, the controlee may use the short MAC address of the controlee (or the controller) as a MAC address of the controlee (or the controller). The MAC address may be used in a MAC header to indicate (or identify) a source device and/or a destination device of a UWB message. That is, the MAC address may identify a UWB device or a UWBS.

In step S040, the controlee may use the extended MAC address of the controlee (or the controller) for data encryption. For example, the controlee may use the extended MAC address as part of a nonce used for data encryption.

In FIG. 5, the short MAC address is used as an actual MAC address, and the extended MAC address is only used for data encryption, not as the MAC address, as described above. In this case, due to the limited 2-byte length of the short MAC address, the number of terminals identifiable by MAC addresses is limited. In this case, even though extended MAC addresses are extended for use as MAC addresses, the number of identifiable terminals is still limited because an extended MAC address is configured by simply padding a 2-byte short MAC address with 6 bytes of zeroes.

Therefore, it is necessary to consider a method of configuring an extended MAC address in a new manner and using the extended MAC address as well as a short MAC address as a MAC address.

Figure 6:
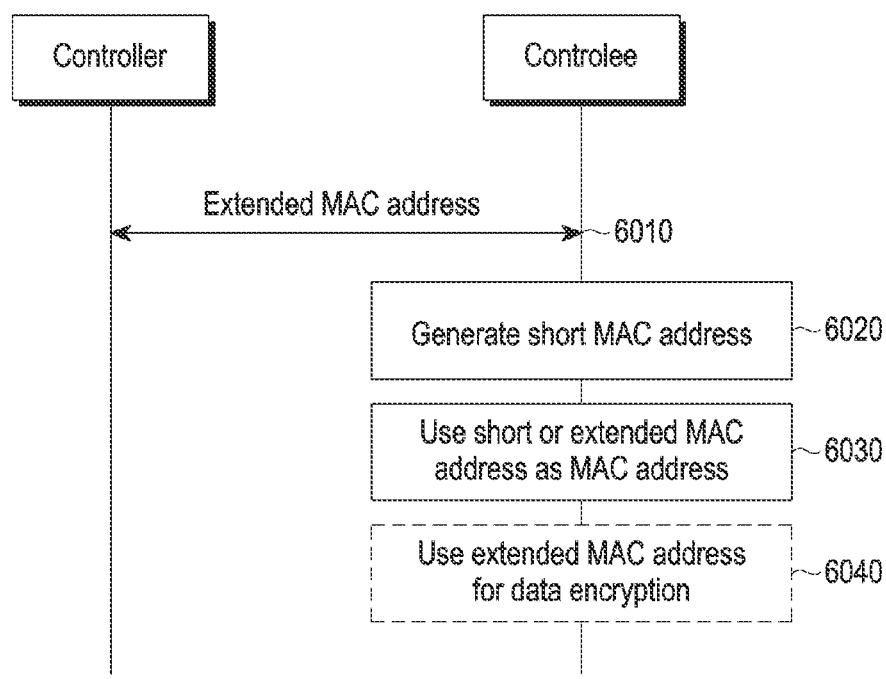
FIG. 6 illustrates a method of configuring a MAC address according to an embodiment.

FIG. 6 illustrates a method of configuring a MAC address according to an embodiment.

In FIG. 6, a short MAC address corresponds to a 2-byte address, and an extended MAC address corresponds to an 8-byte address configured according to a new scheme, instead of padding a short MAC address with zeroes. The extended MAC address may be configured in, but not limited to, one of the following methods.

Method 1: When a product is released, a MAC address preconfigured in a higher layer (framework) is used as an extended MAC address, or an extended MAC address is generated using this MAC address.

Method 2: A MAC address associated with a specific application (e.g., stored in a specific FiRa applet) is used as an extended MAC address or an extended MAC address generated using this MAC address.

Method 3: An extended MAC address is generated using all or part of a MAC address of an OOB component (e.g., wireless fidelity (Wi-Fi) component or BLE component) of a UWB device.

Referring to FIG. 6, in step 6010, a controller and a controlee may exchange extended MAC addresses of each UWB device.

The controller may generate an extended MAC address of the controlee and transmit the generated extended MAC address to the controlee. Alternatively, the controlee may generate its extended MAC address and transmit the generated extended MAC address to the controller. The extended MAC addresses of the controlee may be exchanged by this operation.

The controller may generate its short MAC address and/or extended MAC address and transmit the short MAC address and/or extended MAC address to the controlee.

In step 6020, when identifying (or obtaining) the extended MAC address of the controlee (or controller), the controlee may generate a short MAC address based on the extended MAC address. When the extended MAC address of the controlee (or controller) is received (or when the extended MAC address of the controlee is generated by the controlee), the controlee may generate a short MAC address from the extended MAC address in a preset generation method, which will be described below with reference to FIGS. 8, 9 and 10.

In step 6030, the controlee may use the short MAC address or the extended MAC address of the controlee (or controller) as a MAC address of the controlee (or controller). The MAC address may be used in a MAC header to indicate (or identify) a source device and/or a destination device of a UWB message. That is, the MAC address may identify a UWB device or a UWBS.

In step 6040, the controlee may use the extended MAC address of the controlee (or controller) for data encryption. For example, the controlee may use the extended MAC address as part of a nonce used for data encryption.

As such, an extended MAC address may be configured, as which 8-byte possible cases are available, not by zero padding of 6 bytes to a short MAC address of 2 bytes in FIG. 6. Accordingly, compared to FIG. 5 in which the number of identifiable terminals is limited due to the limited 2-byte length of the short MAC address, the number of identifiable terminals by MAC addresses may increase in FIG. 6, thereby increasing the use cases that may be supported.

Figure 7:
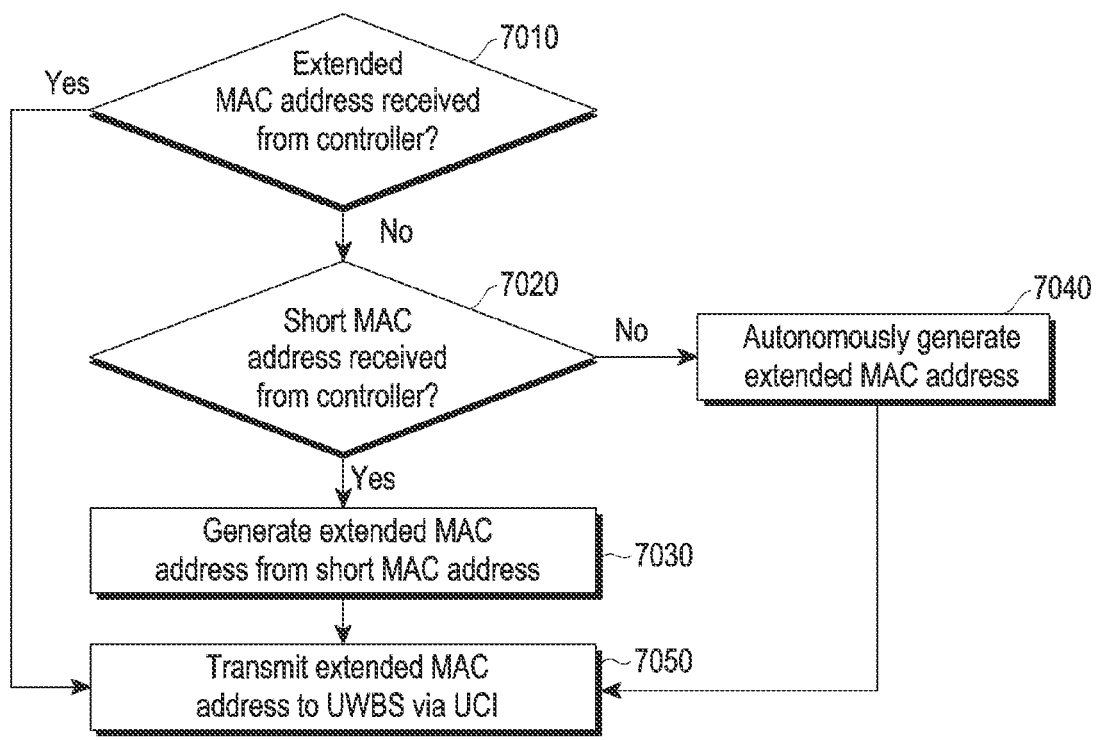
FIG. 7 illustrates a method of obtaining an extended MAC address of a controlee by the controlee according to an embodiment.

FIG. 7 illustrates a method of obtaining an extended MAC address of a controlee by the controlee according to an embodiment.

The controlee may determine whether an extended MAC address of the controlee has been received from the controller in step 7010. The controlee may receive the extended MAC address of the controlee from the controller through the above-described UWB configuration parameter UWB_CONFIGURATION. FIG. 4 describes a method of transmitting the UWB configuration parameter UWB_CONFIGURATION.

When the extended MAC address has not been received, the controlee may determine whether a short MAC address of the controlee has been received from the controller in step 7020. The controlee may receive the short MAC address of the controlee from the controller through the above-described UWB configuration parameter UWB_CONFIGURATION, as described above in reference to FIG. 4.

Upon receipt of the short MAC address, the controlee may generate an extended MAC address, using the short MAC address in step 7030. For example, the controlee may generate the extended MAC address, using zero padding.

When the short MAC address has not been received, the controlee may autonomously generate an extended MAC address in step 7040. The controlee may generate its extended MAC address using one of the following methods.

Method 1: When a product is released, a MAC address preconfigured in a higher layer (framework) is used as an extended MAC address, or an extended MAC address is generated using this MAC address.

Method 2: A MAC address associated with a specific application (e.g., stored in a specific FiRa applet) is used as an extended MAC address, or an extended MAC address is generated using this MAC address.

Method 3: An extended MAC address is generated using all or part of a MAC address of an OOB component (e.g., Wi-Fi component or BLE component) of a UWB device.

The controller may also generate its extended MAC address, using one of the above methods.

When the extended MAC address is received, when the extended MAC address is generated using the received short MAC address, or when the extended MAC address is autonomously generated, the controlee may transmit the extended MAC address to a UWBS via a UCI in step 7050. This extended MAC address may be used to identify the controlee or the UWBS of the controlee.

Figure 8:
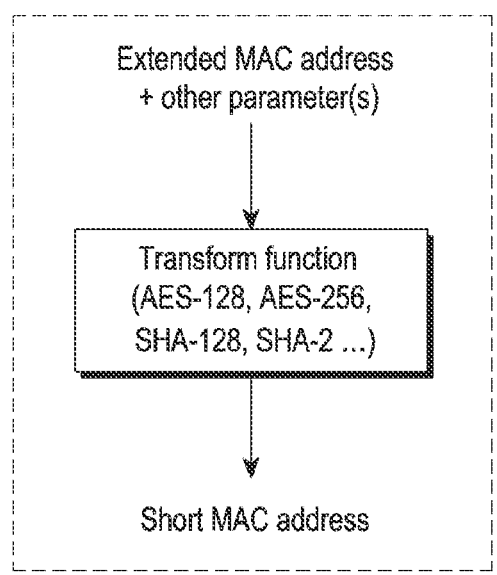
FIG. 8 illustrates a method of generating a short MAC address out of an extended MAC address by a UWB device according to an embodiment.

FIG. 8 illustrates a method of generating a short MAC address using an extended MAC address by a UWB device according to an embodiment.

In FIG. 8, the UWB device may be a controlee or a controller.

In FIG. 8, an operation of transforming an extended MAC address into a short MAC address may be performed in a UWB-enabled application, a UWB framework, or a UWBS of the UWB device. Referring to FIG. 8, the UWB device may generate a short MAC address from an extended MAC address, using a preset transform function.

The transform function may be an encryption function (e.g., advanced encryption standard (AES)-128 or AES-256), as will be described below with reference to FIG. 9. The transform function may be a Hash function (e.g., secure Hash algorithm (SHA)-128 or SHA-2), as will be described below with reference to FIG. 10.

To generate a short MAC address, an extended MAC address and at least one parameter (transform parameter) may be used as an input of the transform function. For example, a concatenation (string concatenation) of the extended MAC address and the at least one parameter may be used as an input of the transform function. As such, not only an extended MAC address but also at least one parameter is used as an input of the transform function, thereby increasing the diversity of the generated short MAC address.

The at least one parameter may be at least one (e.g., at least one of application configuration parameters) among parameters set by a higher layer via a UCI. For example, the at least one parameter may include at least one of a session ID identifying a UWB session, an STS index used to generate an STS (e.g., a phyStsIndex parameter that is a shared global frame counter used to generate an STS), or a vendor specific value (e.g., an STATIC_STS_IV parameter) used to generate an STS.

Figure 9:
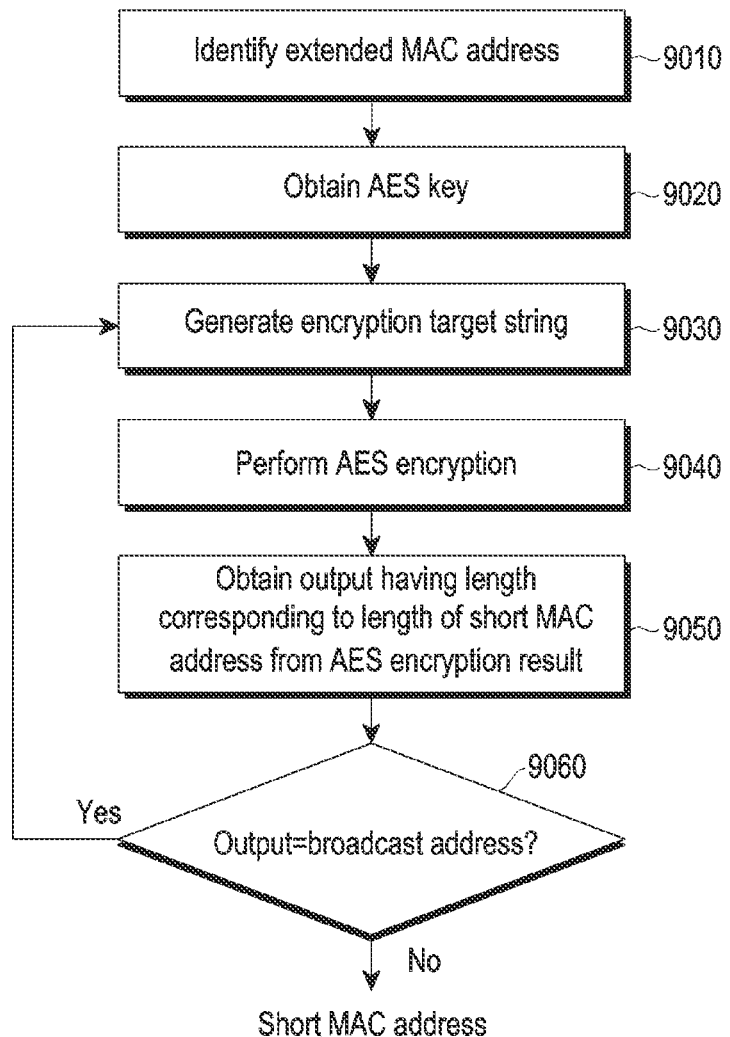
FIG. 9 illustrates a method of generating a short MAC address out of an extended MAC address, using an advanced encryption standard (AES) as a transform function by a UWB device according to an embodiment.

FIG. 9 illustrates a method of generating a short MAC address from an extended MAC address, using an AES as a transform function by a UWB device according to an embodiment.

In FIG. 9, the UWB device may be a controlee or a controller.

Referring to FIG. 9, the UWB device may identify an extended MAC address in step 9010. The extended MAC address may be configured in a higher layer.

The UWB device may obtain a symmetric key used for AES encryption in step 9020. In the disclosure, a symmetric key used for AES encryption may be referred to as an AES key. This AES key should be the same value as pre-shared between the controller and controlee.

The UWB device may use a static value as the value of the AES key. For example, the controlee and the controller may use a pre-shared static value as the value of the AES key. The static value may be one of the following values.

First value for AES-128: e.g., 0x5368727441646472 ("ShrtAddr" in ASCII value)
Second value for AES-256: e.g., 0x53686F72744D41434164647265737321 ("ShortMACAddress!" in ASCII value)
Third value: Session key value used to generate STS (e.g., 128 upper bits of 0x53746174_69635453_53746174_69635453 ("StaticTSStaticTS" in ASCII value))

Alternatively, the UWB device may negotiate an AES key value with another UWB device through an OOB channel (e.g., BLE OOB). For example, the controller may randomly generate an AES key value and transmit the generated AES key value to the controlee through the OOB channel. Alternatively, each of the controller and the controlee may generate an AES key value using a key exchange procedure through the OOB channel.

The UWB device may generate a string input to a transform function (AES) in step 9030. Herein, the string input to the AES may be referred to as an encryption target string.

The encryption target string may be a concatenation (string concatenation) of an extended MAC address and at least one parameter. As such, as not only the extended MAC address but also the at least one parameter is used as an input to the transform function, the diversity of generated short MAC addresses may be increased.

The at least one parameter may be at least one of application configuration parameters among parameters configured by a higher layer via a UCI. For example, the at least one parameter may include at least one of a session ID identifying a UWB session, an STS index used to generate an STS (e.g., a phyStsIndex parameter that is a shared global frame counter used to generate an STS), or a vendor specific value (e.g., a STATIC_STS_IV parameter) used to generate an STS.

The UWB device may perform AES encryption based on the encryption target string. The UWB device may perform AES encryption, using the AES key by inputting the encryption target string as an input to an encryption function (e.g., AES-128 or AES-256). Accordingly, the UWB device may obtain an AES encryption result in step 9040.

The UWB device may obtain an output having a length corresponding to the length (e.g., 2 bytes) of the short MAC address from the AES encryption result (by truncation) in step 9050. For example, the UWB device may truncate the lower 2 bytes or upper 2 bytes of the AES encryption result.

The UWB device may determine whether the output corresponds to a broadcast address (e.g., 0xffff) in step 9060.

When the output is the broadcast address, the UWB device may return to step 9030. This process may prevent the value of the broadcast address from being used as a short MAC address value.

When the output is not the broadcast address, the UWB device may determine the obtained output to be a short MAC address.

Figure 10:
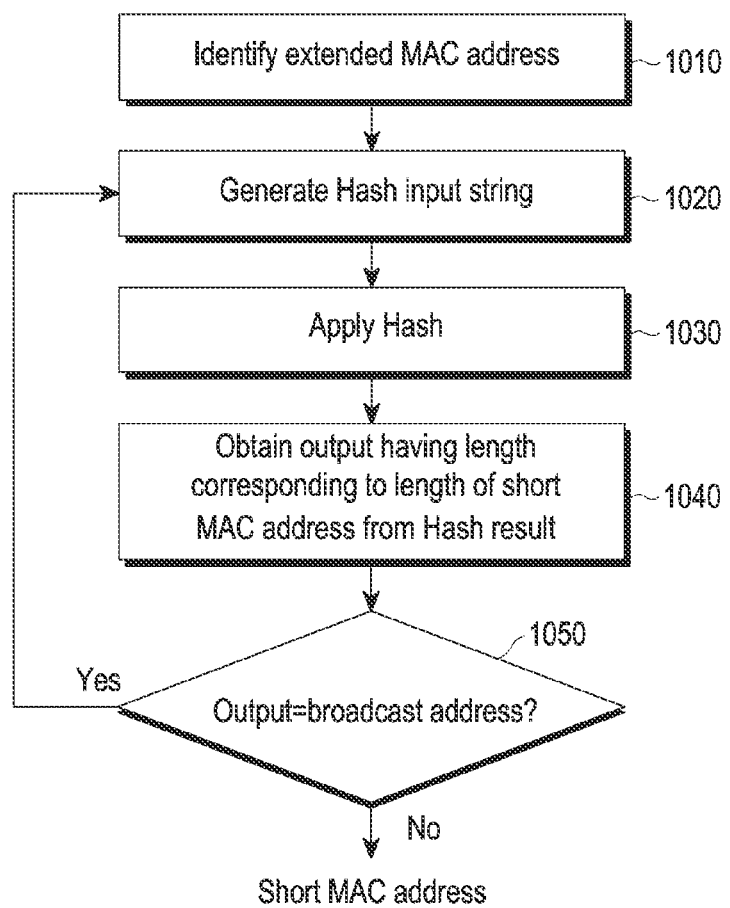
FIG. 10 illustrates a method of generating a short MAC address out of an extended MAC address, using a Hash function as a transform function by a UWB device according to an embodiment.

FIG. 10 illustrates a method of generating a short MAC address from an extended MAC address, using a Hash function as a transform function by a UWB device according to an embodiment.

Referring to FIG. 10, the UWB device may identify an extended MAC address in step 1010. The extended MAC address may be configured in a higher layer.

The UWB device may generate a string input to a transform function (Hash function) in step 1020. The string input to the Hash function may be referred to as a Hash input string.

The Hash input string may be a concatenation (string concatenation) of the extended MAC address and at least one parameter. As such, the use of not only the extended MAC address but also the at least one parameter as an input to the transform function may increase the diversity of generated short MAC addresses.

The at least one parameter may be at least one of application configuration parameters among parameters configured by the higher layer via a UCI. For example, the at least one parameter may include at least one of a session ID identifying a UWB session, an STS index used to generate an STS (e.g., a phyStsIndex parameter that is a shared global frame counter used to generate an STS), or a vendor specific values (e.g., STATIC_STS_IV parameter) used to generate an STS.

The UWB device may apply the Hash function to the Hash input string in step 1030. The UWB device may obtain a Hash result by applying the Hash function (e.g., SHA-128 or SHA-2) to the Hash input string.

The UWB device may obtain an output having a length corresponding to the length (e.g., 2 bytes) of a short MAC address from the Hash result (by truncation) in step 1040. For example, the UWB device may truncate the lower 2 bytes or upper 2 bytes of the Hash result.

The UWB device may determine whether the output corresponds to a broadcast address (e.g., 0xffff) in step 1050.

When the output is the broadcast address, the UWB device may return to step 1020. This process may prevent the value of the broadcast address from being used as a short MAC address value.

When the output is not the broadcast address, the UWB device may determine the obtained output to be a short MAC address.

Figure 11:
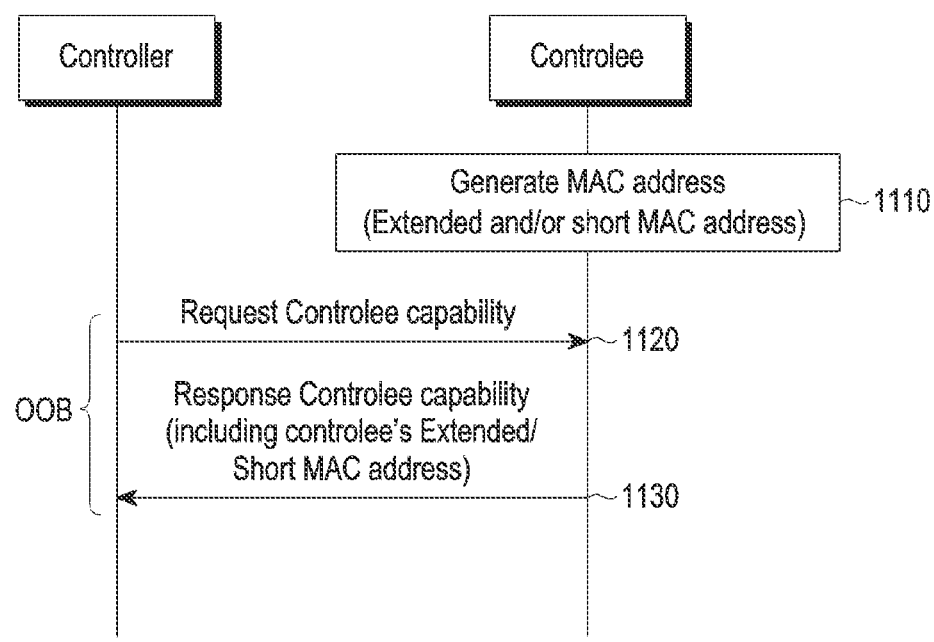
FIG. 11 illustrates a method of generating a MAC address and transmitting the generated MAC address to a controller through OOB communication by a controlee according to an embodiment.

FIG. 11 illustrates a method of generating a MAC address and transmitting the generated MAC address to a controller through OOB communication by a controlee according to an embodiment.

In FIG. 11, the controlee may use the OOB phase (see FIG. 4) to transmit a MAC address.

In FIG. 11, the controlee may transmit its MAC address to the controller through an OOB channel according to a request of the controller.

In step 1110, the controlee may generate its MAC address.

In step 1120, the controlee may receive a request for controlee capability information from the controller. The request may be a GET request for the controller to obtain controlee capability information/parameter UWB_CAPABILITY from the controlee.

In step 1130, in response to the request, the controlee may transmit a response including controlee capability information/parameter including a MAC address of the controlee to the controller. The controlee may transmit the MAC address of the controlee through a controlee information message CONTROLEE_INFO including the controlee capability parameter.

The controlee capability information may include a parameter indicating an extended MAC address of the controlee and/or a parameter indicating a short MAC address of the controlee. Alternatively, the controlee capability information UWB_CAPABILITY may include a parameter indicating the MAC address of the controlee.

Table 6 below illustrates an example of the controlee capability parameter UWB_CAPABILITY including the MAC address of the controlee.

TABLE 6

| Parameter | Notes |
| --- | --- |
| ... | ... |
| Controlee Extended MAC Addresses | 0: Controlee does not support extended MAC address<br>1: Controlee supports extended MAC address |
| Initiator Extended MAC Address | 0: Controlee as initiator does not support extended MAC address<br>1: Controlee as initiator supports extended MAC address<br>If controller is initiator, this parameter can be omitted |
| Controlee MAC Address | MAC Address of Controlee to be used |

As illustrated in Table 6, the controlee capability parameter may include a controlee MAC address parameter indicating the MAC address of the controlee to be used.

The parameter of Table 6 may be included and transmitted together with all or part of the parameter of Table 1 in the controlee capability parameter.

Figure 12:
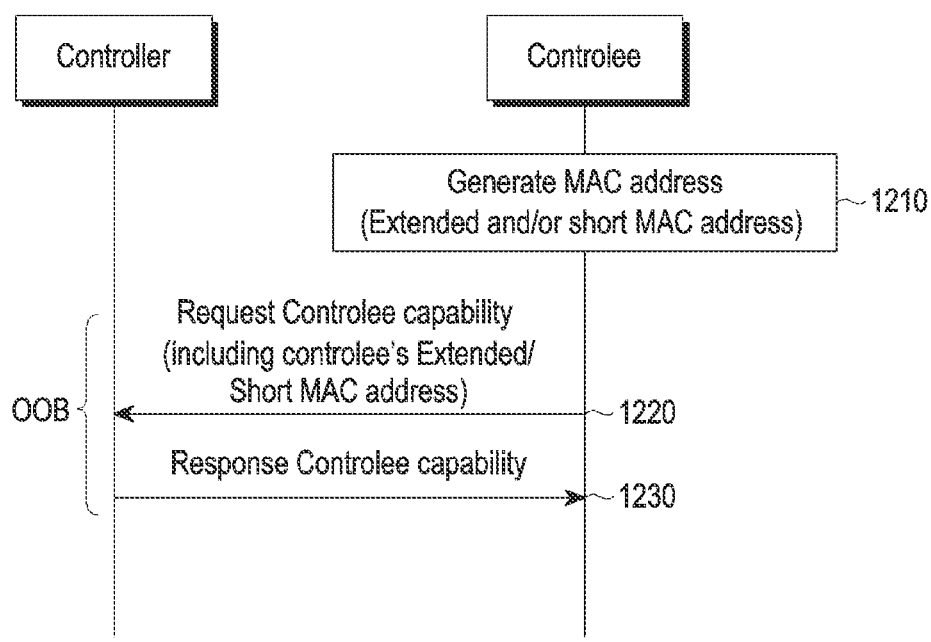
FIG. 12 illustrates a method of generating a MAC address and transmitting the generated MAC address to a controller through OOB communication by a controlee according to another embodiment.

FIG. 12 illustrates a method of generating a MAC address and transmit the generated MAC address to a controller through OOB communication by a controlee according to an embodiment.

In FIG. 12, the controlee may use the OOB phase (see FIG. 4) to transmit a MAC address.

Compared to FIG. 11, the controlee may transmit its MAC address to the controller through an OOB channel regardless of the controller's request in FIG. 12. That is, the controlee may push a generated MAC address to the controller.

In step 1210, the controlee may generate its MAC address.

In step 1220, the controlee may transmit a request including controlee capability information/parameter including a MAC address of the controlee to the controller. This request may be a PUT request for the controlee to push the controlee capability information/parameter UWB_CAPABILITY to the controller. The controlee may transmit the MAC address of the controlee through a controlee information message including the controlee capability parameter.

The controlee capability information UWB_CAPABILITY may include a parameter indicating an extended MAC address of the controlee and/or a parameter indicating a short MAC address of the controlee. Alternatively, the controlee capability information UWB_CAPABILITY may include a parameter indicating the MAC address of the controlee.

Table 6 above may be an example of the controlee capability parameter UWB_CAPABILITY including the MAC address of the controlee.

In step 1230, the controller may transmit a response corresponding to the request to the controlee.

Figure 13:
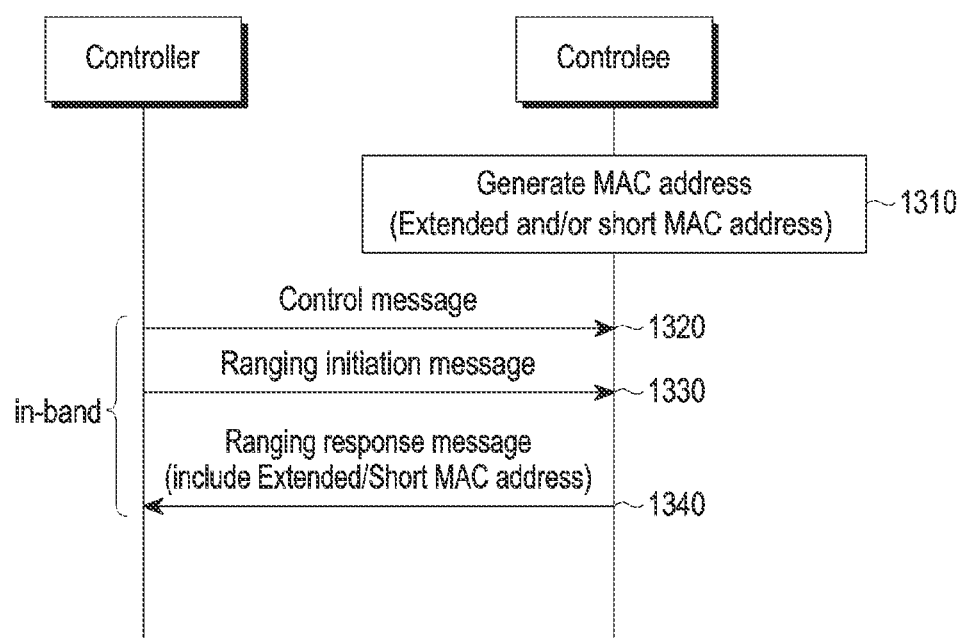
FIG. 13 illustrates a method of generating a MAC address and transmitting the generated MAC address to a controller through in-band communication by a controlee according to an embodiment.

FIG. 13 illustrates a method of generating a MAC address and transmitting the generated MAC address to a controller through in-band communication by a controlee according to an embodiment.

In FIG. 13, the controller may operate as an initiator for UWB ranging, and the controlee may operate as a responder.

In FIG. 13, the controlee may use the UWB phase (see FIG. 4) to transmit a MAC address.

In step 1310, the controlee may generate its MAC address, such as its extended MAC address and/or short MAC address.

In step 1320, the controller may transmit a control message to the controlee. The controller may broadcast the control message periodically or aperiodically. The control message may include at least one parameter required for establishing a UWB session, at least one parameter required for contention-based ranging, and/or at least one parameter required for in-band discovery.

In step 1330, the controller may transmit a ranging initiation message to the controlee via UWB, to initiate UWB ranging.

In step 1340, in response to the ranging initiation message, the controlee may transmit a ranging response message including a MAC address of the controlee to the controller through a UWB. For example, the controlee may transmit a ranging response message including the extended MAC address and/or short MAC address of the controlee.

As such, the MAC address of the controlee generated by the controlee may be transmitted through the ranging response message through the UWB in FIG. 13. The MAC address of the controlee may be transmitted in an in-band manner by this operation.

Figure 14:
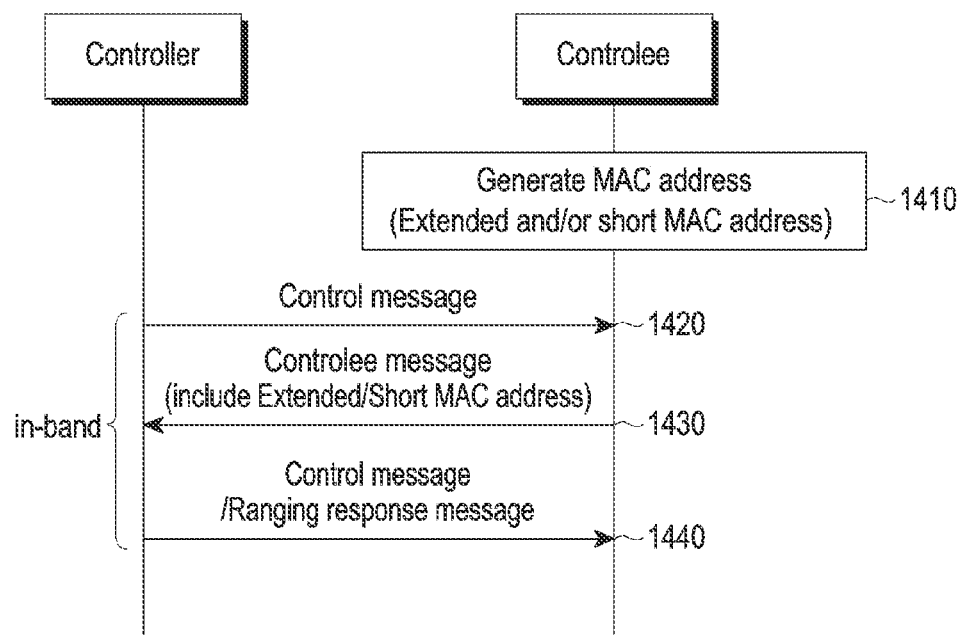
FIG. 14 illustrates a method of generating a MAC address and transmitting the generated MAC address to a controller through in-band communication by a controlee according to an embodiment.

FIG. 14 illustrates a method of generating a MAC address and transmitting the generated MAC address to a controller through in-band communication by a controlee according to an embodiment.

In FIG. 14, the controlee may use the UWB phase (see FIG. 4) to transmit a MAC address.

In step 1410, the controlee may generate its MAC address, such as its extended MAC address and/or short MAC address.

In step 1420, the controller may transmit a first control message to the controlee. The controller may broadcast the first control message periodically or aperiodically. The first control message may include at least one parameter required for establishing a UWB session, at least one parameter required for contention-based ranging, and/or at least one parameter required for in-band discovery.

In step 1430, the controlee may transmit a controlee message including a MAC address of the controlee to the controller through a UWB. For example, the controller may transmit the controlee message including the extended MAC address and/or the short MAC address of the controlee. The controlee message may be one of any messages transmitted from the controlee. The controlee message may be a ranging initiation message for initiating UWB ranging.

In step 1440, the controller may transmit a second control message and/or a ranging response message to the controlee via the UWB. For example, when the controlee message is a ranging initiation message, the controller may transmit a ranging response message in response to the ranging initiation message. The second control message may include the MAC address of the controlee, unlike the first control message. The second control message may include the MAC address of the controlee and a ranging slot index in which the controlee will transmit the ranging initiation message later.

As such, in FIG. 14, the MAC address of the controlee generated by the controlee may be transmitted to the controller through a separate message or the ranging initiation message transmitted from the controlee through the UWB. Through this operation, the MAC address of the controlee may be transmitted in an in-band manner.

Figure 15:
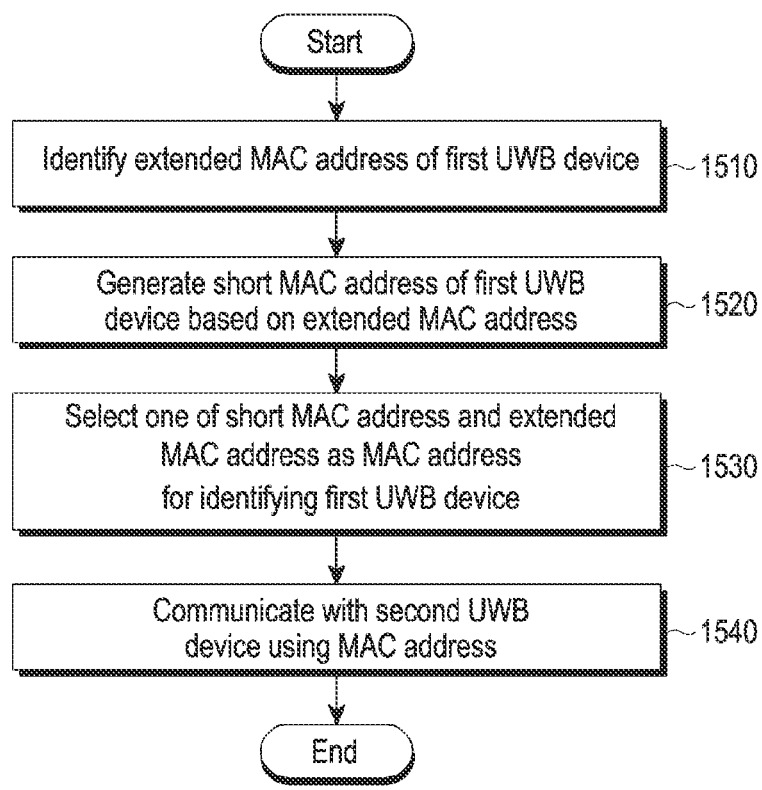
FIG. 15 illustrates a method of a first UWB device according to an embodiment.

FIG. 15 illustrates a method of a first UWB device according to an embodiment.

In FIG. 15, the first UWB device may serve as a controlee, and a second UWB device may serve as a controller.

Referring to FIG. 15, the first UWB device may identify an extended MAC address of the first UWB device in step 1510.

Identification (or acquisition) of the extended MAC address of the first UWB device may be performed according to the method of FIG. 7.

The extended MAC address may be configured (generated) according to one of the previously described methods of configuring an extended MAC address with reference to FIG. 6. For example, the extended MAC address of the first UWB device may correspond to a fixed MAC address preset in a higher layer of the first UWB device, a MAC address stored in an applet included in a security component of the first UWB device, or a MAC address generated using all or part of a MAC address of the OOB component in the first UWB device.

The first UWB device may generate a short MAC address of the first UWB device based on the extended MAC address in step 1520.

The short MAC address of the first UWB device may be generated according to FIGS. 8 to 10. For example, the generation of the short MAC address of the first UWB device may include generating input data based on the extended MAC address and at least one transform parameter, generating output data by applying a preset transform function to the input data, and generating a short MAC address based on the output data, and the transform function may be an AES encryption function or a Hash function. The at least one transform parameter may include at least one of a session ID for identifying a UWB session, an STS index value used to generate an STS, or a vendor specific value used to generate an STS.

The first UWB device may select one of the short MAC address and the extended MAC address as a MAC address identifying the first UWB device in step 1530.

The first UWB device may communicate with the second UWB device, using the MAC address in step 1540. For example, the first UWB device may include all or part of the MAC address in a MAC header of a MAC frame including a UWB message and may transmit the MAC frame to the second UWB device. In this case, the MAC address may be used to identify (indicate) a source device (the first UWB device) of the UWB message.

The first UWB device may transmit at least one of the extended MAC address or the short MAC address to the second UWB device through an OOB message or a UWB message. The extended MAC address and/or the short MAC address may be transmitted based on FIGS. 11 to 14.

The OOB message may be a controlee information message CONTROLEE_INFO including controlee capability information. The CONTROLEE_INFO message may include the controlee capability parameter UWB_CAPABILITY of Table 1 and/or Table 6.

The UWB message may be a ranging initiation message for initiating UWB ranging or a ranging response message transmitted in response to the ranging initiation message.

Figure 16:
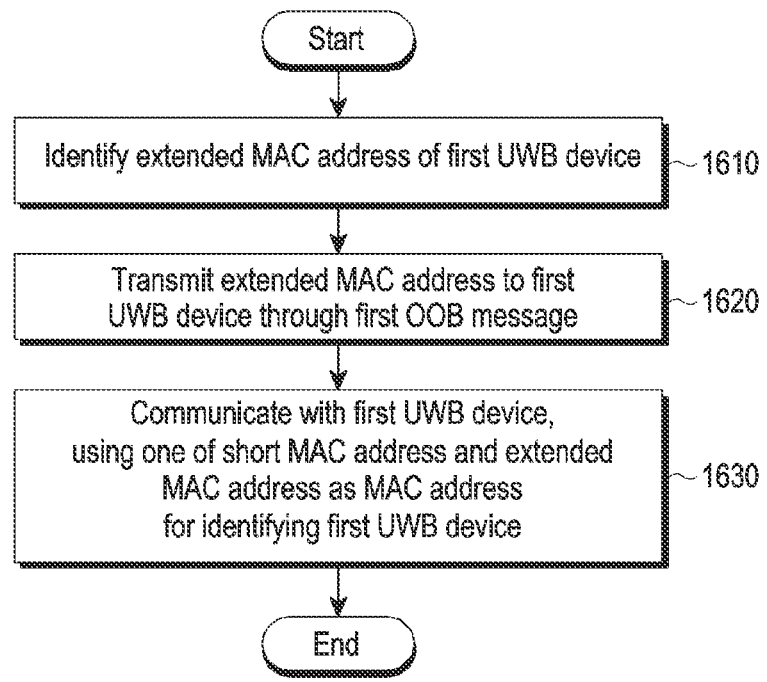
FIG. 16 illustrates a method of a second UWB device according to an embodiment.

FIG. 16 illustrates a method of a second UWB device according to an embodiment.

In FIG. 16, a first UWB device serves as a controlee, and the second UWB device serves as a controller.

The second UWB device may generate or identify an extended MAC address of the first UWB device in step 1610. The extended MAC address may be configured (generated) according to one of the methods of configuring an extended MAC address described before with reference to FIG. 6. For example, the extended MAC address of the first UWB device may correspond to a fixed MAC address preset in a higher layer of the first UWB device, a MAC address stored in an applet included in a secure component of the first UWB device, or a MAC address generated using all or part of a MAC address of an OOB component in the first UWB device.

The second UWB device may transmit the extended MAC address to the first UWB device through a first OOB message in step 1620. The first OOB message may be a session data message SESSION_DATA including UWB configuration information used to establish a UWB session. The SESSION_DATA message may include the parameter of Table 2, 3 and/or 4.

The second UWB device may communicate with the first UWB device, using one of the extended MAC address or a short MAC address of the first UWB device generated based on the extended MAC address as a MAC address identifying the first UWB device in step 1630. The generation of the MAC address of the first UWB device may be performed according to FIGS. 8, 9 and 10.

For example, the second UWB device may include all or part of the MAC address in a MAC header of a MAC frame including a UWB message and transmit the MAC frame to the first UWB device. In this case, the MAC address may be used to identify (indicate) a destination device (the first UWB device) of the UWB message.

The second UWB device may receive a short MAC address from the first UWB device through a second OOB message or a UWB message. The second OOB message may be a controlee information message CONTROLEE_INFO including controlee capability information. The UWB message may be a ranging initiation message for initiating UWB ranging or a ranging response message transmitted in response to the ranging initiation message.

Figure 17:
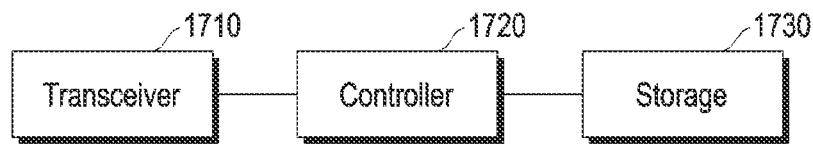
FIG. 17 illustrates the structure of an electronic device according to an embodiment.

FIG. 17 illustrates the structure of an electronic device according to an embodiment.

In FIG. 17, the electronic device may correspond to a UWB device, include a UWB device, or include part of a UWB device.

Referring to FIG. 17, the electronic device may include a transceiver 1710, a controller 1720, and a storage 1730. The controller 1720 may be defined as a circuit, an application specific integrated circuit, or at least one processor.

The transceiver 1710 may transmit and receive a signal to and from another entity. The transceiver 1710 may transmit and receive data for UWB ranging, for example.

The controller 1720 may provide overall control to the electronic device according to the embodiments of the disclosure. For example, the controller 1720 may control a signal flow between blocks to perform the methods disclosed herein.

The storage 1730 may store at least one of information transmitted and received through the transceiver 1710 or information generated through the controller 1720. For example, the storage 1730 may store information and data required for configuring a MAC address described with reference to FIGS. 1 to 16.

In the embodiments of the disclosure, elements are expressed in the singular or plural forms. However, the singular or plural expressions are appropriately selected in the context, for convenience of description, and the disclosure is not limited thereto. Even though an element is expressed as a plural form, the element may be singular. Even an element expressed as singular may include a plurality of elements.

It will be understood that each block of the flowchart illustrations and combinations of the flowchart illustrations may be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for executing the functions specified in the flowchart block(s). These computer program instructions may also be stored in a computer-usable or computer-readable memory that may direct the computer or other programmable data processing equipment to function in a particular manner, such that the instructions stored in the computer-usable or computer-readable memory produce an article of manufacture including instruction means which execute the functions specified in the flowchart block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions specified in the flowchart block(s).

While the disclosure has been particularly shown and described with reference to embodiments thereof, it will be understood by those skilled in the art that various changes in form and details may be made therein without departing from the scope of the subject matter as defined by the appended claims and their equivalents.

What is claimed is:

1. A method of a first ultra-wideband (UWB) device, comprising:
   identifying an extended medium access control (MAC) address of the first UWB device;
   generating input data based on the extended MAC address and at least one transform parameter;
   generating output data by applying a preset transform function to the input data;
   generating a short MAC address based on the output data;
   selecting one of the short MAC address and the extended MAC address as a MAC address of the first UWB device; and
   performing UWB communication with a second UWB device, using the selected MAC address,
   wherein the second UWB device operates as a controller defining and controlling a control message for UWB ranging,
   wherein the first UWB device operates as a controlee using information included in the control message, and
   wherein the at least one transform parameter includes at least one of a session identifier (ID) identifying a UWB session, a scrambled timestamp sequence (STS) index value used to generate an STS, or a vendor specific value used to generate the STS.

2. The method of claim 1,
   wherein the extended MAC address of the first UWB device corresponds to a fixed MAC address preset in a higher layer of the first UWB device, a MAC address stored in an applet included in a secure component of the first UWB device, or a MAC address generated by using all or part of a MAC address of an out-of-band (OOB) component in the first UWB device.

3. The method of claim 1, further comprising transmitting at least one of the extended MAC address or the short MAC address to the second UWB device through an OOB message or a UWB message.

4. The method of claim 3,
   wherein the OOB message is a controlee information message including capability information about the controlee.

5. The method of claim 3,
   wherein the UWB message is a ranging initiation message initiating UWB ranging or a ranging response message responding to the ranging initiation message.

6. The method of claim 1,
   wherein the preset transform function is one of an advanced encryption standard (AES) encryption function or a Hash function.

7. A method of a second ultra-wideband (UWB) device, comprising:
   generating an extended medium access control (MAC) address of a first UWB device;
   transmitting the extended MAC address to the first UWB device through a first out-of-band (OOB) message; and
   performing UWB communication with the first UWB device, using one of the extended MAC address and a short MAC address of the first UWB device as a MAC address of the first UWB device,
   wherein the second UWB device operates as a controller defining and controlling a control message for UWB ranging,
   wherein the first UWB device operates as a controlee using information included in the control message,
   wherein the short MAC address is generated by generating input data based on the extended MAC address and at least one transform parameter, generating output data by applying a preset transform function to the input data, and generating the short MAC address based on the output data, and
   wherein the at least one transform parameter includes at least one of a session identifier (ID) identifying a UWB session, a scrambled timestamp sequence (STS) index value used to generate an STS, or a vendor specific value used to generate the STS.

8. The method of claim 7,
   wherein the extended MAC address of the first UWB device corresponds to a fixed MAC address preset in a higher layer of the first UWB device, a MAC address stored in an applet included in a secure component of the first UWB device, or a MAC address generated by using all or part of a MAC address of an OOB component in the first UWB device.

9. The method of claim 7, further comprising receiving the short MAC address from the first UWB device through a second OOB message or a UWB message.

10. The method of claim 9,
    wherein the first OOB message is a session data message including UWB configuration information used to configure a UWB session, and wherein the second OOB message is a controlee information message including capability information about the controlee.

11. The method of claim 9, wherein the UWB message is a ranging initiation message initiating UWB ranging or a ranging response message responding to the ranging initiation message.

12. A first ultra-wide band (UWB) device for performing secure ranging, the first UWB device comprising:
a transceiver; and
a controller operationally connected with the transceiver, the controller being configured to:
identify an extended medium access control (MAC) address of the first UWB device;
generate input data based on the extended MAC address and at least one transform parameter;
generate output data by applying a preset transform function to the input data;
generate a short MAC address based on the output data;
select one of the short MAC address and the extended MAC address as a MAC address of the first UWB device; and
perform UWB communication with a second UWB device, using the selected MAC address,
wherein the second UWB device operates as a controller defining and controlling a control message for UWB ranging,
wherein the first UWB device operates as a controlee using information included in the control message, and
wherein the at least one transform parameter includes at least one of a session identifier (ID) identifying a UWB session, a scrambled timestamp sequence (STS) index value used to generate an STS, or a vendor specific value used to generate the STS.

13. The first UWB device of claim 12, wherein the extended MAC address of the first UWB device corresponds to a fixed MAC address preset in a higher layer of the first UWB device, a MAC address stored in an applet included in a secure component of the first UWB device, or a MAC address generated by using all or part of a MAC address of an out-of-band (OOB) component in the first UWB device.

14. The first UWB device of claim 12, wherein the controller is further configured to transmit at least one of the extended MAC address or the short MAC address to the second UWB device through an OOB message or a UWB message.

15. The first UWB device of claim 14, wherein the OOB message is a controlee information message including capability information about the controlee.

16. The first UWB device of claim 14, wherein the UWB message is a ranging initiation message initiating UWB ranging or a ranging response message responding to the ranging initiation message.

17. The first UWB device of claim 12, wherein the preset transform function is one of an advanced encryption standard (AES) encryption function or a Hash function.

18. A second ultra-wide band (UWB) device for performing secure ranging, the second UWB device comprising:
a transceiver; and
a controller operationally connected with the transceiver, the controller being configured to:
generate an extended medium access control (MAC) address of a first UWB device;
transmit the extended MAC address to the first UWB device through a first out-of-band (OOB) message; and
perform UWB communication with the first UWB device, using one of the extended MAC address and a short MAC address of the first UWB device as a MAC address of the first UWB device,
wherein the second UWB device operates as a controller defining and controlling a control message for UWB ranging,
wherein the first UWB device operates as a controlee using information included in the control message,
wherein the short MAC address is generated by generating input data based on the extended MAC address and at least one transform parameter, generating output data by applying a preset transform function to the input data, and generating the short MAC address based on the output data, and
wherein the at least one transform parameter includes at least one of a session identifier (ID) identifying a UWB session, a scrambled timestamp sequence (STS) index value used to generate an STS, or a vendor specific value used to generate the STS.

* * * * *